United States Patent [19]

Pennebaker, Jr. et al.

[11] 4,011,157
[45] Mar. 8, 1977

[54] ULTRASONIC REMOVAL OF SOLID IMPURITIES FROM RECIRCULATING INK

[75] Inventors: William Boone Pennebaker, Jr., Carmel; Keith Samuel Pennington, Somers; Hugo Karl Seitz, Putnam Valley, all of N.Y.; Frederick Hochberg, deceased, late of Yorktown, N.Y., by Lee Hochberg, administratrix

[73] Assignee: International Business Machines Corporation, Armonk, N.Y.

[22] Filed: Jan. 30, 1976

[21] Appl. No.: 653,813

[52] U.S. Cl. .................................. 210/19; 210/84; 55/15;277;446; 101/366; 118/603; 346/140 R; 261/DIG. 48

[51] Int. Cl.² ........................................ B01D 43/00

[58] Field of Search .............. 55/15, 228, 270, 277, 55/446; 210/19, 84, 384, 388; 261/DIG. 48; 101/366; 118/603; 346/140

[56] References Cited

UNITED STATES PATENTS

| | | | |
|---|---|---|---|
| 2,088,994 | 8/1937 | Corey | 55/446 |
| 3,729,138 | 4/1973 | Tysk | 261/DIG. 48 |
| 3,929,071 | 12/1975 | Cialone et al. | 197/1 R |
| 3,959,798 | 5/1976 | Hochberg et al. | 346/74 J |

*Primary Examiner*—Bernard Nozick
*Attorney, Agent, or Firm*—J. Jancin, Jr.; Andrea P. Bryant

[57] ABSTRACT

In an ink jet printer solid impurities contaminating recirculating ink are removed by subjecting contaminated ink to ultrasonic energy for forming an aerosol of the ink. The aerosol of ink is entrained in an air stream and carried to impactor means where the ink aerosol is caused to return to a liquid state.

5 Claims, 3 Drawing Figures

ULTRASONIC REMOVAL OF SOLID IMPURITIES FROM RECIRCULATING INK

BACKGROUND OF THE INVENTION

This invention relates to removal of solid impurities from liquids. More particularly it relates to removal of contaminants from ink recirculating in an ink jet printer or the like.

In ink jet printing droplets of ink issuing from a print head nozzle, which is often an array of several nozzles, are selectively deposited on a recording medium. Ink not used for printing is removed from the print station through a gutter and fed back to an ink supply line for recirculation and reuse. In the short distance from nozzle to gutter, nonprinting ink often becomes contaminated with particles of dust, lint or even insect wings from surrounding areas. Because of close tolerances which must be observed in the ink jet nozzle apparatus, solid impurities must be removed from recirculating ink before it enters the return line to print head. Mechanical filters such as stainless steel screens have been used for this purpose as taught in U.S. Pat. No. 3,929,071 Cialcone, et al., "Ink Recirculating System for Ink Jet Printing Apparatus", and assigned to the same assignee as the present invention.

Ink jet line printers are provided with a plurality of nozzles and often pump gallons of ink per hour. Usually several levels of filtration occur in the recirculation system. Progressively finer filters are provided at each level. Heretofore, ink has been caused to flow through screens, plates, mesh, or membranes of various materials. It is at the first filter station that the largest particulate impurities are removed. Due to the nature of the impurities and the filter means used in the prior art, the printer must frequently be shut down to clean or replace clogged filters. Efficient throughput is thereby hampered. The problem, naturally, increases with the number of printing nozzles provided and the volume of ink pumped. For example, in an ink jet printer capable of producing a line of characters in less than a second, the volume of nonprinting ink, from a large number of nozzle arrays, e.g., 144, collected through a common gutter for recirculation through a common ink supply line is much greater than that recirculated in a character by character ink jet printer such as that disclosed in the above referenced U.S. Pat. No. 3,929,071. Because such a large volume of ink is recirculated in a short period of time in a line printer, filtering ink through a screen or mesh at the first filter station results in rapid filter clogging. The solution to frequent clogging suggested by the prior art involves merely increasing the effective filter area. Providing a larger filter area however, may lead to other problems related to physical size or cost constraints of the machine. There is therefore a limit to the size of filter which can be used.

It has been shown that large quantities of fluid can be nebulized, i.e., formed into an aerosol, in a short time by ultrasonic techniques. For example, typically the rates for water are 0.2cc/sec. at 60 watts at 1.3MHz. Higher rates can easily be achieved with a higher level of ultrasonic power from one or more transducers. The drop diameter at 1.3MHz is about 2 microns. During nebulization larger droplets may form, but gravitational forces cause them to fall back. The aerosol comprises smaller, lighter droplets. Ultrasonic nebulizers capable of producing such an aerosol are commercially available and are frequently used in the medical field for inhalation therapy involving a variety of medicaments.

Ultrasonic nebulizers have also been used to form mists of a variety of ink types including magnetic ink for the selective deposition thereof to a surface for purposes of coating, printing, copying or the like. Such nebulizer applications are disclosed in the following patent and copending applications assigned to the same assignee as the present invention, U.S. Pat. No. 3,959,798 "Selective Wetting Using a Micromist of Particles", Hochberg, et al., Ser. No. 576,407, filed May 19, 1975 by Hochberg, et al., "Micromist Jet Printer", and Ser. No. 581,058, filed May 1975, by Hochberg, et al., "Method and Apparatus for Recording Information on a Recording Surface Through the Use of Non-Directed Particles."

These applications disclose ultrasonic nebulization of ink or other marking fluid to form a mist which is then directed toward the receiving medium. The mist so generated is caused to contact the receiving medium using a carrier gas only or in combination with electrostatic or magnetic deflection or attraction. Droplets not used for printing are collected from the print station and subsequently returned to the supply line for recirculation.

It is to be noted the prior art ultrasonic nebulizers referred to above have been used only to generate a mist of particles upon which only operations relating to directing, charging, deflecting or the like are carried out prior to wetting a receiving medium.

OBJECTS OF THE INVENTION

It is an object of our invention to improve the filtering process in a recirculating ink supply line in order to increase machine throughput by minimizing down time required for filter maintenance.

It is another object of our invention to provide an alternative to cloggable filters for the removal of solid impurities from recirculating ink.

It is another object of our invention to eliminate the requirement for mechanical filters at one or more filter stations in the ink recirculation system in an ink jet line printer.

SUMMARY OF THE INVENTION

The present invention applies the technology of ultrasonic nebulization to the separation of solid impurities from contaminated ink in an ink jet line printer. Ink containing solid impurities is subjected to a suitable ultrasonic frequency; and an aerosol forms comprising ink droplets of small diameter, e.g., 1 to 2 microns. Impurities of size exceeding that of the droplets comprising the aerosol remain at the bottom of the chamber in which nebulization occurs. The ink aerosol is transported in an air stream and subsequently caused to reliquefy in impactor means. Ink substantially free from solid impurities of size greater than, e.g., 1 micron is available for return to an ink supply line for use at a print station.

The inventive apparatus comprises a housing containing a nebulizer chamber for producing an aerosol of ink substantially free of solid impurities from contaminated ink and an impactor chamber wherein the uncontaminated ink aerosol is returned to a liquid state. Air under controlled pressure and velocity acts as a transporting means for carrying the generated aerosol from the nebulizer chamber to the impactor chamber.

Employing the inventive apparatus as the primary filter station in the ink recirculation system of an ink jet printer avoids the above noted problems associated with prior art mechanical filters since the size of, and pressure in the input line to the nebulizer chamber are easily made sufficiently large for free flow of contaminated ink.

The foregoing and other objects, features and advantages of the invention will be apparent from the following more particular description of the preferred embodiments of the invention as illustrated in the accompanying drawings.

DETAILED DESCRIPTION OF THE INVENTION

Figure 1:
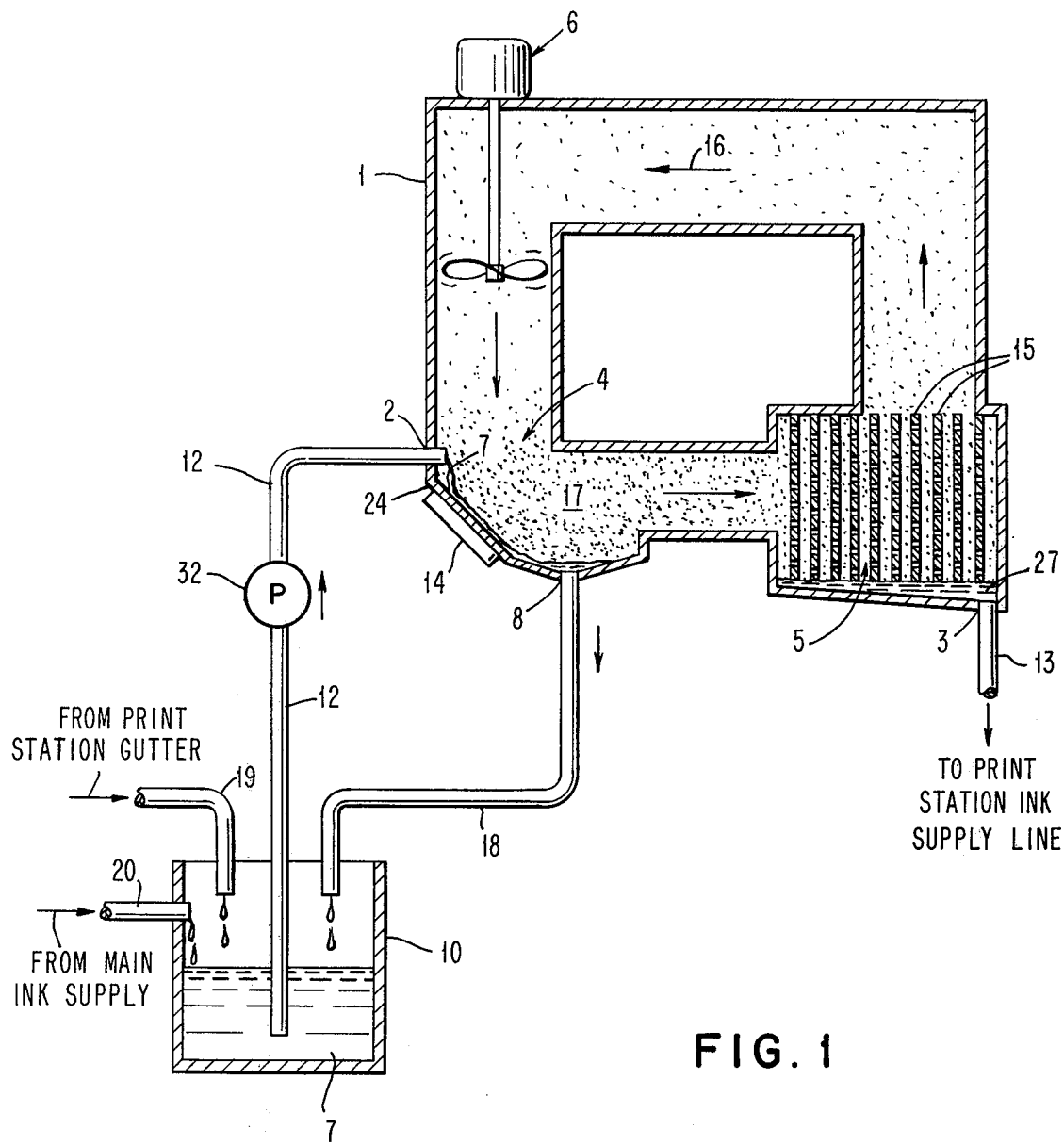
FIG. 1 illustrates a preferred embodiment showing a nebulizer chamber for forming an aerosol from a layer of contaminated ink.

The invention will be described with reference to the preferred embodiment shown in FIG. 1.

Housing 1 has a duct arrangement forming a passageway. Housing 1 is also provided with nebulizer chamber 4 having an inclined wall 24 to which ultrasonic transducer 14 is connected.

Contaminated ink 7 is collected in ink reservoir tank 10 from line 19 connected to gutter means, not shown, at a print station for removal of nonprinting ink. Line 20 supplies to tank 10 fresh ink from a main ink source, not shown. Line 12 is provided for transporting impure ink 7 from tank 10 to inlet port 2 adjacent nebulizer chamber 4 in housing 1.

The flow of impure ink 7 through line 12 is controlled by pump means 32 so that the flow rate is low enough to provide a layer of ink 7 running over the inclined base 24 of nebulizer chamber 4 to which ultrasonic transducer 14 is attached. Upon energization by means not shown, vibrations from ultrasonic transducer 14 generate a aerosol 17 of ink substantially free of impurities.

For purposes of this invention an aerosol 17 substantially free of impurities means an aerosol comprising droplets in the 1 to 2 micron range wherein only contaminant particles so small as to be contained in the ink droplets remain in the aerosol. As noted previously, large, relatively heavy droplets of ink quickly fall back to the base of the nebulizer due to gravitational settling.

In order to carry ink aerosol 17 through the passageway fan 6 upstream of nebulizer chamber 4 provides an air stream moving under controlled pressure and velocity in a direction indicated by arrows 16. Ink aerosol 17 is entrained in the air stream in the passageway of housing 1 for transport downstream to impactor chamber 5.

In order to separate aerosol 17 from the transport air stream plates 15 are provided within impactor chamber 5 for obstructing the air stream flow. Each plate 15 has a patterned array of holes formed therethrough. Plates 15 are arranged so that as between any two adjacent plates 15 their holes are axially offset thereby forcing the air stream to follow a tortuous path through impactor chamber 5. This arrangement enhances the probability of droplets of ink aerosol 17 impinging on plates 15 and coalescing to form larger drops of liquid ink 27 which drain to the bottom of impactor chamber 5. The base of impactor chamber 5 is downwardly inclined to outlet port 3 for receiving ink 27. Line 13 is connected to outlet port 3 for carrying ink 27 to the line supplying the print station, not shown.

Any droplets of aerosol 17 not returned to a liquid state remain entrained in the transport air stream and are returned through the passageway to nebulizer chamber 4.

An outlet port 8 is provided in nebulizer chamber 4 downstream of and at a lower level than ultrasonic transducer 14 for receiving nebulization residue comprising unnebulized ink and impurities for return through line 18 to tank 10. Tank 10 can be made removable so as to disconnect it from lines 12, 18, 19, and 12 for cleaning or replacement.

It is apparent to those skilled in the art that other arrangements of input and output lines may be employed in accordance with the invention. For example, tank 10 may be the primary ink source and line 20 would be unnecessary.

In ultrasonic technology frequency of vibration and characteristics of the substance being vibrated are factors determining the size of the resultant nebulized particles. The velocity of the air stream is taken into account in controlling impaction rate of the generated aerosol.

Impaction parameters are calculated by means of the equation for deflection of particle trajectories $\delta$, relative to an air stream $$\delta = \tau \theta v_s$$

where $\theta$ is the angle through which the air stream is deflected, $v_s$ is the average air velocity, and $\tau$ is the relaxation time for decay of drop velocity relative to the air stream. $\tau$ is related to the drop diameter D, the drop density $\rho$, and the viscosity of air $\mu$ by the following equation:

$$\tau = D^2 \rho / 18 \mu$$

The significance of these relationships is set forth in more detail in the previously referenced copending application Ser. No. 576,407, "Micromist Jet Printer", filed Dec. 31, 1974, and assigned to the same assignee as the instant invention.

It is understood by those skilled in the art, that although the invention has been described having reference to an air stream for entraining the aerosol other suitable carrier gasses may be employed. Likewise while we have shown a nebulizer chamber with a single ultrasonic transducer, the apparatus of the invention may be made suitable for applications requiring increased ink volume thoughput by using more than one transducer of the same or higher power.

Nebulizers which may be used in accordance with the instant invention are available from the DeVilbiss Company. One such nebulizer has an operating frequency of 1.3 MHz. The diameter of the chamber is 8 cm; the height 10 cm. Ink is nebulized into three micron particles (nominal size) at the rate of 6cc/min.

Although the DeVilbiss nebulizer is effective to generate micron size nebulized ink particles as required in accordance with the principles of the present invention, it should be understood that other forms of ultrasonic nebulization may likewise, be as effective.

Figure 2:
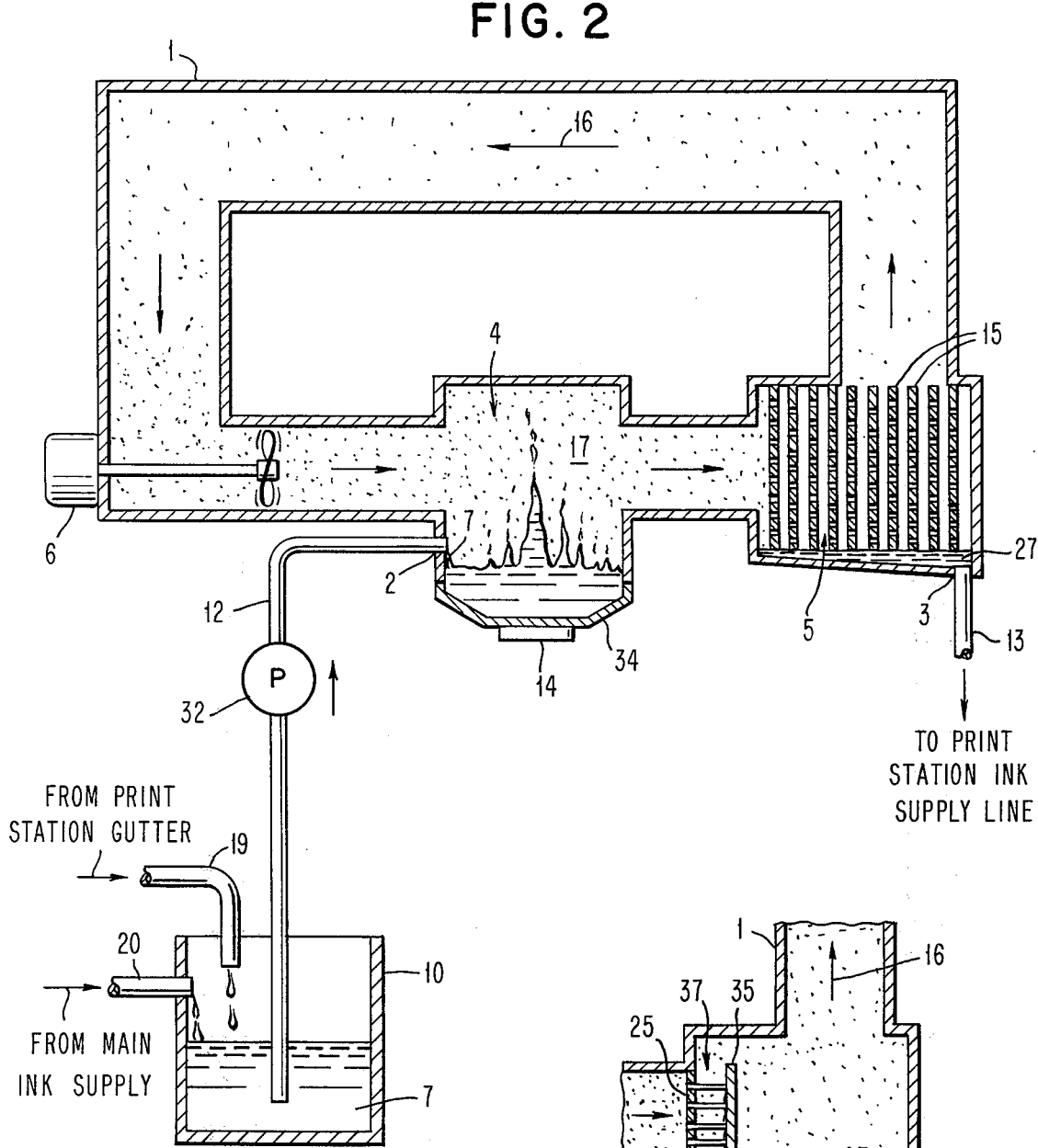
FIG. 2 illustrates another embodiment of the invention showing a nebulizer chamber for forming an aerosol from a fountain of contaminated ink.

FIG. 2 illustrates an alternative embodiment of the inventive apparatus. Elements performing the same functions in both FIGS. 1 and 2 are indicated by the same reference numerals. Nebulizer chamber 4 of FIG. 2 has a deep bottom section where ink 7 to be purified is collected and nebulization residue comprising solid impurities and some ink is retained. The base 34 of nebulizer chamber 4 is made separable from the nebulizer chamber to provide for periodic removal of nebulization residue.

It is apparent that other arrangements for removing nebulization residue from nebulizer 4 are within the scope of this invention. For example, means for periodically flushing nebulizer chamber 4 may be provided using separate, additional inlet and outlet ports. Such a modification to the illustrated apparatus would further decrease machine down time caused by maintenance of impurity removing means since such flushing could be a controlled function carried out after a given amount of printing has occurred.

As noted with regard to the embodiment shown in FIG. 1 the invention contemplates the use of various ink supply arrangements. For example, line 12 carrying ink 7 may be connected to inlet port 2 by valve means operable as a function of the ink level detected by well known means in nebulizer 4.

Figure 3:
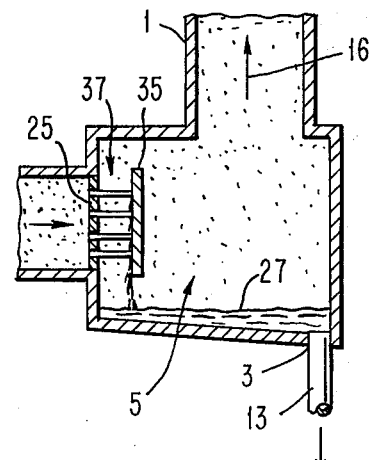
FIG. 3 illustrates another impactor embodiment.

FIG. 3 illustrates another form of impactor suitable for use in accordance with either of the previously described exemplary embodiments shown in FIGS. 1 and 2.

At the entrance to impactor chamber 5 is a plate 25 having an array of orifices fabricated therethrough for forming the mist 17 entrained in the transport air stream into jets of ink mist 37 which impinge on solid plate 35 and form larger drops of substantially pure ink 27 which collects in the base of impactor chamber 5.

Other impaction means than those above described may, of course, be employed in implementing the instant invention. Separators such as mechanical centrifugal, screw, and cyclone types are well known in the art. By way of further example, a spiral slot or a moving vane arrangement may be used. With magnetic inks magnetic precipitation may be used to reliquify the aerosol formed in the nebulizer chamber. Electrostatic precipitation methods are applicable, as is apparent to those skilled in the art, with a variety of commercially available inks including magnetic ink.

It is also apparent that if a moving vane arrangement is employed in the impactor chamber for liquifying aerosol 17 such a vane could also perform the function of illustrated fan 6. i.e., supplying a pressurized transport air stream.

OPERATION OF THE INVENTION:

The operation of the invention as the first filter station in the ink recirculation system of an ink jet line printer will be described with reference to FIG. 1.

Contaminated ink 7 collected in reservoir tank 10 is pumped through line 12 to inlet port 2 of housing 1. Pump 32 controls the flow of ink 7 to provide a thin layer of contaminated ink 7 running over inclined base 24 of nebulizer chamber 4. Ultrasonic vibrations emanating from transducer 14 form an aerosol 17 comprising ink particles substantially free of impurities greater than one micron in size. Nebulization residue comprising solid impurities and unnebulized ink drains from the nebulizer chamber through outlet port 8 and returns via line 18 to reservoir tank 10. The air stream moving under controlled pressure and velocity from fan 6 carries the mist 17 downstream through the passageway toward impactor 5.

The plates 15 in impactor 5, it will be recalled, are each provided with a patterned array of holes. The holes in adjacent plates are so misaligned that the air stream in which the ink aerosol 17 is entrained follows a tortuous path. As a result of the tortuous path followed by the air stream, impaction of aerosol droplets against plates 15 is enhanced and ink is separated from the air stream by inertial effects. Impinging droplets coalesce and liquid ink 27 collects at the base of the impactor chamber 5. Ink 27 exits the impactor chamber at outlet port 3 and enters line 13 which is connected to the ink supply line to the print station.

Unliquefied aerosol droplets remain in the transport air stream and return therewith through the passageway to nebulizer chamber 4.

Although we have described our invention as embodied in the ink recirculation system of an ink jet line printer, it should be apparent that our apparatus will be useful in other applications having a liquid filtration step for the removal of solid impurities. Our apparatus provides for liquid purification without the aforementioned disadvantages associated with prior art filter plates, screens, meshes or the like which eventually become clogged and require cleaning and/or replacement.

While the invention has been particularly shown and described with reference to the preferred embodiments, it will be understood by those skilled in the art that various changes in form and detail may be made without departing from the spirit and scope of the invention.

What is claimed is:

1. Filtration apparatus for ink or other liquids contaminated with solid impurities comprising:
   a housing for containing said liquid having an input port and an output port;
   ultrasonic transducer means connected to said housing for exciting said housing thereby forming from said liquid an aerosol comprising micron size droplets with said solid impurities exceeding droplet size remaining in said housing;
   means for removing said solid impurities from said housing;
   a source of gas under pressure connected to said input port for entraining said aerosol to said output port of said housing;
   impaction means connected to said output port for receiving and liquefying said aerosol; and
   a gas feedback path connected from said impaction means to said input port for returning said gas under pressure and unliquefied aerosol to said housing.

2. Apparatus for separating ink and solid impurities in a recirculating system in an ink jet printer for providing uncontaminated liquid ink to a print station comprising:
   a housing having a closed loop passageway, a liquid inlet port and a liquid outlet port;
   a supply of contaminated ink connected to said liquid inlet port;
   ultrasonic nebulizer means connected to said housing adjacent said liquid inlet port for forming from said contaminated ink an aerosol of ink substantially free of solid impurities;
   means for removing said solid impurities from said housing;

pressurizing means in said passageway upstream of said ultrasonic nebulizer means for providing an air stream for transporting said aerosol of ink;

impactor means in said passageway downstream of said ultrasonic nebulizer means for removing from said air stream said aerosol and returning it to a liquid state for output through said liquid outlet port; and said air stream carrying unliquefied droplets of said aerosol through said passageway for return to said ultrasonic nebulizer means.

3. Apparatus as set forth in claim 2 wherein said wall of said ultrasonic nebulizer means being inclined downward from said liquid inlet port;

said supply of said contaminated ink connected to said liquid inlet port including pump means for controlling the flow of said contaminated ink so as to form a layer on said inclined wall; and an outlet port in said ultrasonic nebulizer means adjacent the lower side of said inclined wall for receiving said solid impurities and unnebulized ink.

4. Apparatus as set forth in claim 2 wherein said ultrasonic nebulizer means includes a chamber for containing a pool of said contaminated ink.

5. A method for purifying ink contaminated with solid impurities in an ink jet printer ink recirculation system comprising the steps of:

subjecting the contaminated ink to ultrasonic vibrations to form said ink into an aerosol;

removing said solid impurities;

entraining said aerosol of ink in an air stream moving under pressure for carrying said aerosol away from the source of ultrasonic vibrations; and reliquefying said aerosol for utilization at a print station.

* * * * *